(12) United States Patent  (10) Patent No.: US 8,924,463 B2
Zhong et al.  (45) Date of Patent: *Dec. 30, 2014

(54) METHOD, SYSTEM AND DEVICE FOR REPORTING USER AGENT PROFILE INFORMATION

(71) Applicant: Huawei Technologies Co., Ltd., Shenzhen, Guangdong (CN)

(72) Inventors: Xueping Zhong, Shenzhen (CN); Xiaoqian Chai, Shenzhen (CN); Linyi Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,060

(22) Filed: Nov. 20, 2013

(65) Prior Publication Data

US 2014/0082044 A1  Mar. 20, 2014

Related U.S. Application Data

(63) Continuation of application No. 12/327,149, filed on Dec. 3, 2008, now Pat. No. 8,620,992, which is a continuation of application No. PCT/CN2007/001072, filed on Apr. 3, 2007.

(30) Foreign Application Priority Data

Jun. 7, 2006 (CN) .......................... 2006 1 0083179

(51) Int. Cl.
*G06F 15/16* (2006.01)
*H04L 29/08* (2006.01)
*H04L 12/46* (2006.01)
*H04L 12/66* (2006.01)

(52) U.S. Cl.
CPC .............. *H04L 67/303* (2013.01); *H04L 12/46* (2013.01); *H04L 12/66* (2013.01); *H04L 67/306* (2013.01)
USPC .......................................................... 709/202

(58) Field of Classification Search
CPC .............. H04L 67/303; H04L 12/2829; H04L 29/06836
USPC ........ 709/202, 203, 246, 224; 455/432.3, 899
See application file for complete search history.

(56) References Cited

U.S. PATENT DOCUMENTS

| 6,662,012 | B1 | 12/2003 | Do |
| 8,621,423 | B2* | 12/2013 | Knight et al. ................. 717/106 |
| 2001/0013088 | A1* | 8/2001 | Matsumoto ................... 711/135 |
| 2006/0101471 | A1* | 5/2006 | Adermann et al. ........... 719/310 |
| 2007/0259683 | A1 | 11/2007 | Hartikainen et al. |

FOREIGN PATENT DOCUMENTS

| CN | 1630252 A | 6/2005 |
| GB | 2328110 A | 2/1999 |

(Continued)

OTHER PUBLICATIONS

1st Office Action in related U.S. Appl. No. 12/327,149 (Jan. 25, 2011).

(Continued)

*Primary Examiner* — El Hadji Sall
(74) *Attorney, Agent, or Firm* — Leydig, Voit & Mayer, Ltd.

(57) ABSTRACT

A method, system, and device for reporting User Agent Profile (UAP) information are disclosed. In the embodiments of the invention, UAP information is associated with an attribute group label, and a client identifies the attribute group label and reports UAP attribute information associated with the identified attribute group label to a server side according to the identified attribute group label, thereby avoiding reporting all UAP attribute information and further saving network resources. Moreover, in the case that a change occurs in the value of a device capability UAP attribute of a terminal or in the attribute group label of the server side, if such a change affects an existing service, the client only needs to send the changed device capability UAP information to the server side, thereby further avoiding transmitting a large volume of UAP information and further saving the network resources.

19 Claims, 10 Drawing Sheets

(56) References Cited

FOREIGN PATENT DOCUMENTS

| | | | |
|---|---|---|---|
| JP | 07121174 A | 5/1995 |
| JP | 2000295310 A | 10/2000 |
| JP | 2005032151 A | 2/2005 |
| JP | 2005070924 A | 3/2005 |
| JP | 2007512602 A | 5/2007 |
| KR | 20050120221 A | 12/2005 |
| WO | WO 0074408 A1 | 12/2000 |
| WO | WO 03102817 A1 | 12/2003 |
| WO | WO 2005050478 A1 | 6/2005 |
| WO | WO 2006019276 A1 | 2/2006 |

OTHER PUBLICATIONS

Fonseca, Jose Manuel Cantera, "Design and Implementation of a Device Description Repository," Telefonia Position Paper, Telefonica (May 31, 2006).

"Device Profile Requirements," OMA-RD-DPE-V1_0-20060517-D, Draft Version 1.0, Open Mobile Alliance (May 17, 2006).

"User Agent Profile," OMA-TS-UAProf-V2_0-20060117-A, Approved Version 2.0, Open Mobile Alliance (Jan. 17, 2006).

"Wireless Application Protocol," WAP-248-UAPROF-20011020-a, Version 20, Wireless Application Protocol Forum (Oct. 20, 2001).

Yang et al., "A Web Recommendation Method Based on User Interest Model," Proceedings of the Fifth International Conference on Machine Learning and Cybernetics, Dalian, IEEE, New York, New York (Aug. 2006).

Examination Report in Chinese Patent Application No. 200780000276.8 (Apr. 22, 2010).

Examination Report in Korean Patent Application No. 10-2008-7031006 (Jul. 1, 2010).

PCT Written Opinion of the International Searching Authority (Jul. 19, 2007).

European Search Report (Dec. 16, 2009).

* cited by examiner

METHOD, SYSTEM AND DEVICE FOR REPORTING USER AGENT PROFILE INFORMATION

CROSS-REFERENCE TO RELATED APPLICATIONS

This application is a continuation of U.S. patent application Ser. No. 12/327,149, filed on Dec. 3, 2008, which is a continuation of International Patent Application No. PCT/CN2007/001072, filed Apr. 3, 2007, which claims priority to Chinese Patent Application No. 200610083179.7, filed Jun. 7, 2006. The afore-mentioned patent applications are hereby incorporated by reference in their entireties.

FIELD OF THE INVENTION

The present invention relates to the field of communication technologies, and in particular, to a method, system, and device for reporting User Agent Profile (UAP) information.

BACKGROUND OF THE INVENTION

The diversity of terminals available on markets greatly enriches the personalized selections of user requirements. However, the diversity of the terminals also causes great differences in terminal capabilities, such as a screen size, color, and font. Even a single terminal varies dynamically in its capabilities with the insertion of a camera into the terminal or the selection of Bluetooth phone. In order to enable the terminals to properly display content such as browsed web pages and Multimedia Messaging Service (MMS), and to enable a server to most efficiently utilize the capabilities provided by the terminals, the related art provides a standardized representation of terminal capabilities and a corresponding method for identifying the terminal capabilities by the server, thereby enabling the server to adapt and provide for a user the content that best matches the user's mode, according to the terminal capabilities.

In the related art, when a connection is established between a client and an origin server, or when User Agent Profile (UAP) information representative of a terminal capability parameter concerning browsing capability has been updated, it is required to report the UAP information to the sever. The processes for reporting UAP information in the above two cases will be illustrated, respectively.

FIG. 1 is a schematic diagram showing a process for reporting the UAP information in the case that a connection is established between a client and a server, according to the related art.

Step 101: A UAP client initiates a browsing request containing the client terminal's UAP information, typically a Uniform Resource Locator (URL) of the UAP, to an origin server.

Step 102 to 103: The origin server initiates a request for obtaining the UAP to a UAP repository according to the URL of the UAP, and obtains the UAP.

Step 104: The origin server returns a response to the UAP client, and if the origin server may properly process the UAP information, the origin server returns information indicating successful reception of the UAP; otherwise, the origin server returns an error code.

The process shown in FIG. 1 only occurs in the initial stage of a session in which a connection is established between a client and a server side, and a session will be maintained between the server and the client until the server or the client switches off the connection. During this process, the server side may cache the client terminal's UAP information.

FIG. 2 is a schematic diagram showing a process for updating the UAP information, according to the related art.

Step 201 to 202: After updating UAP information by a UAP client, the UAP client sends information indicating a change of capability information to an origin server.

Step 203 to 204: The origin server requests and obtains the changed UAP from a UAP repository, according to the received change information.

Step 205: The origin server returns a response to the UAP client, and if the origin server may properly process the UAP information, the origin server returns information indicative of the successful reception of the UAP; otherwise, the origin server returns an error code.

During the updating of the UAP information, the client notifies the server of such a change of its UAP via a Resume message. This occurs for multiple times during the browsing process of the terminal.

The above UAP is primarily used for adapting, in terms of contents, the capabilities of the server side and the client. As an example, in the case that the client wants to browse a web page, there are great differences in colors and display screen sizes supportable by the terminals due to the diversity of the terminal capabilities, and even for the same terminal, there are differences in the preferences of different users, such as font and whether to receive pictures on the web page. Accordingly, there is a need for a method for adapting terminal capabilities and user requirements by the server. The UAP provides a method for the server and the client to represent this and a means to deliver such a representation.

It can be seen from the above process that, due to the increasingly stronger terminal capabilities, there is a need for describing an increasingly larger amount of terminal device information, resulting in larger device capability description files, i.e. larger UAP files. Thus, it takes a long time to resolve the obtained UAP files, and a lot of network resources are occupied during transmission.

Moreover, due to the ever-increasing changes in the terminal device capabilities, the terminal device more frequently reports changed information to the server. It is a waste of the network resources to transmit a part of the changed information that is not service-related.

SUMMARY OF THE INVENTION

Embodiments of the invention provide a method, system, and device for reporting UAP information, thereby avoiding the waste of network resources.

A method for reporting User Agent Profile (UAP) information includes: identifying, by a client, an attribute group, the attribute group being a preset group of UAP attributes; and obtaining and reporting, by the client, a UAP attribute contained in the attribute group and a value of the UAP attribute.

A system for reporting UAP information includes a client located in a terminal device, capable of communicating with a server side located in an origin server. The server side includes an attribute group label issuing module adapted to issue a message containing an attribute group label; and the client includes an attribute group identifying and processing module adapted to identify an attribute group according to the attribute group label, and to obtain and report a UAP attribute contained in the attribute group and the value of the UAP attribute.

A terminal device for reporting UAP information includes a client. The client includes an attribute group identifying and processing module adapted to identify an attribute group according to an attribute group label, and to obtain and report a UAP attribute contained in the attribute group and a value of the UAP attribute.

A Device Profile Evolution (DPE) server includes an attribute group label issuing module adapted to issue a message containing an attribute group label to a client, a setting module adapted to set an attribute group by issuing an attribute group setting message to the client according to a request from an origin server, and a UAP information caching module adapted to cache a UAP attribute reported by a terminal and a value of the UAP attribute.

In the embodiments of the invention, the UAP information is associated with an attribute group label, and a client identifies the attribute group label and reports a UAP attribute and a value of the UAP attribute associated with the identified attribute group label to a server side, thereby avoiding reporting all the UAP attributes and values of the all UAP attributes and saving network resources. Moreover, in the case that a change occurs in a value of a device capability UAP attribute of the terminal or in the attribute group label of the server side, if such a change affects an existing service, the client only needs to send the changed device capability UAP attribute and a value of the changed device capability UAP attribute to the server side, thereby further avoiding transmitting a large number of UAP attributes and values of the UAP attributes and further saving the network resources.

DETAILED DESCRIPTION OF THE EMBODIMENTS

The invention will now be further illustrated in detail in conjunction with accompany drawings and specific embodiments.

According to embodiments of the invention, a client queries and obtains desired UAP information, and reports the information to a server side. Although existing UAPs are able to support representations of static terminal capabilities and certain changes in terminal capabilities, they are not able to support, for example, periodic UAP reporting, notifications based on the threshold of a dynamic attribute, server queries about some capability attributes, etc. In view of this, the embodiments of the invention are implemented using a Device Profile Evolution (DPE) client and a DPE server side, and the server side may be arranged in an origin server, or may be arranged outside the origin server.

In an embodiment of the invention, an association table representative of the association between a UAP attribute group (hereinafter called "attribute group") and an attribute group label is set in a terminal, the attribute group being a preset group of UAP attributes, the attribute group label being an identification that may uniquely identify an attribute group, e.g. a service type. A method for setting the association table is as follows: a DPE server issues an attribute group and an attribute group label to a DPE client by means of, but not limited to, HTTP, in which case, the attribute group and the corresponding label may be carried in a HTTP message header, and the DPE client stores the label and the attribute group in the association table, after receiving a setting message from the DPE server. The association table, which contains an association between the attribute group label and the attribute group, is not necessarily in the form of a table, as long as the association table may represent various forms of the association. The association table is used as an example to illustrate the following embodiments of the invention.

A method for reporting UAP information according to an embodiment of the invention will be described in detail below.

Figure 1:
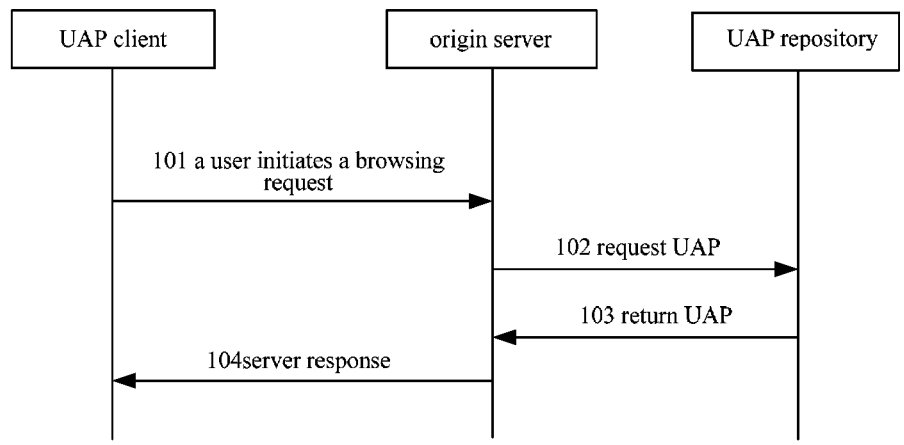
FIG. 1 is a schematic diagram showing a process for reporting UAP information in the case that a connection is established between a client and a server.
Figure 2:
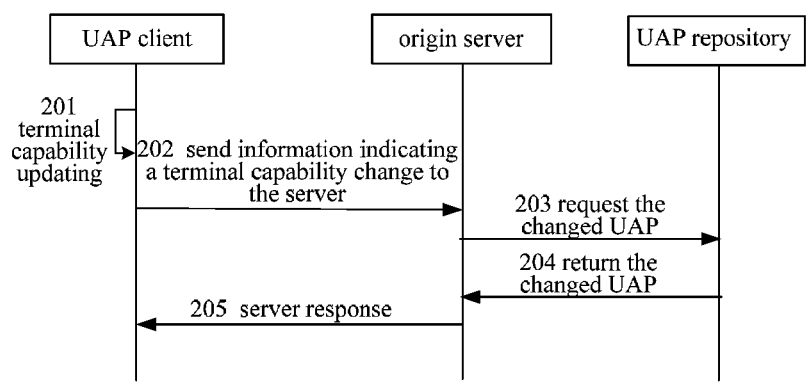
FIG. 2 is a schematic diagram showing a process for updating UAP information.
Figure 3:
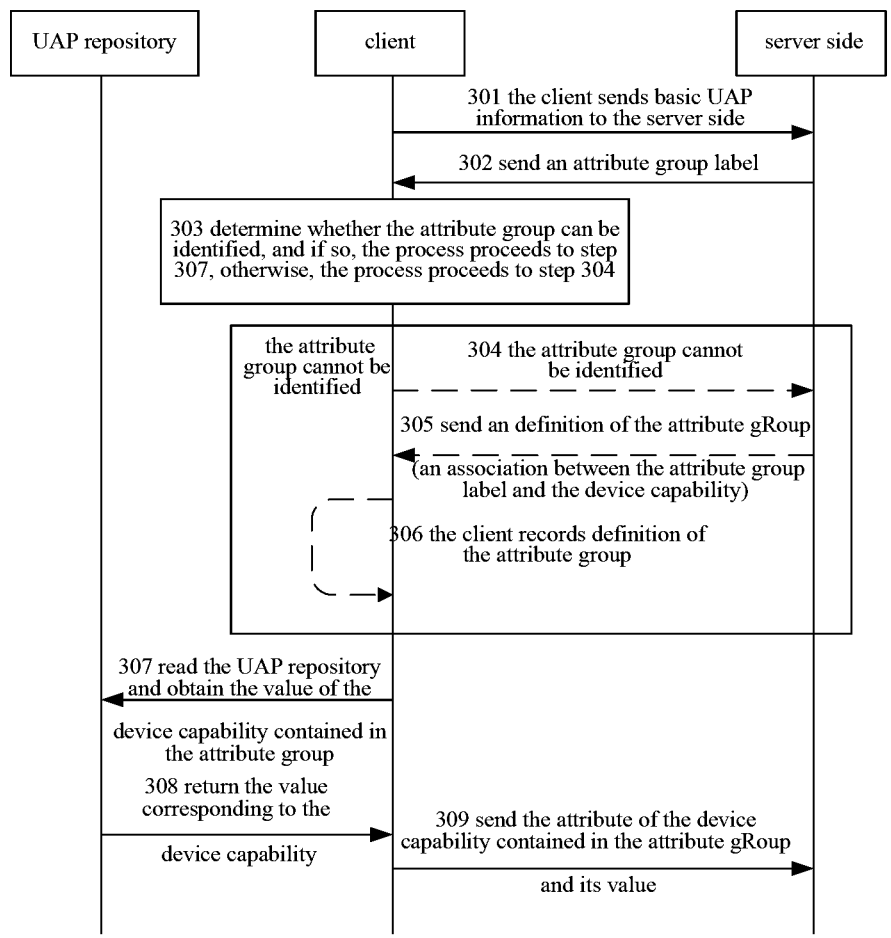
FIG. 3 is a schematic diagram showing a process for reporting UAP information during the establishment of a connection, according to an embodiment of the invention.

With reference to FIG. 3, there is shown a process for reporting UAP information according to an embodiment of the invention during the establishment of a connection in the case that a server side is arranged in an origin server.

Step 301: A client sends an application request containing basic UAP information to a server side. The client carries the reported UAP information in an extended message header "x-wap-profile-diff."

Step 302: The server side issues a response containing an attribute group label according to the received request, the attribute group label being carried in an extended message header "x-wap-profile-warning" and being issued to the client.

Step 303: The client queries a preset association table according to the received attribute group label to determine whether the attribute group exists in that association table, and if so, the process proceeds with Step 307; otherwise, the process proceeds with Step 304. The preset association table may be located in the client, in a UAP repository, or in a terminal device independently of the client and the UAP repository. In other words, the client is capable of identifying the received attribute group by determining that the received attribute group label exists in the terminal device.

Step 304: The client sends error information to the server, containing an indication that the attribute group cannot be identified.

Step 305: The server side sends an attribute group definition to the client; that is, the server notifies the client of the UAP attributes associated with the attribute group label.

Step 306: The client saves the attribute group definition according to the received notification; that is, the client adds the received association information, i.e. the received attribute group definition to the association table, and then the process proceeds with Step 307.

Steps 307-308: The client saves the attribute group for which the server side currently provides an application, obtains UAP attributes contained in the attribute group according to the association table, and determines whether the UAP attributes obtained from the association table is fully contained in the reported basic UAP attributes, and, if so, the client will not report UAP information; otherwise, the client obtains from the UAP repository values of device capability UAP attributes other than the basic UAP information contained in the attribute group.

Step 309: The client reports device capability UAP information containing the device capability UAP attributes and values of the device capability UAP attributes, to the server side.

In the above process, the server side may not process the error information indicating that the attribute group cannot be identified after receiving the error information from the client; that is, Steps 305 and 306 are optional steps and may be omitted.

Moreover, the basic UAP information may not be contained in the application request sent by the client, in which case, in Step 307-308, the client obtains the UAP attributes contained in the attribute group according to the association table, and then obtains the values corresponding to the UAP attributes from the UAP repository. In Step 309, the client reports all UAP attributes and values of the all UAP attributes to the server side. That is, there is no determination in Step 307, and the client reports all UAP information at one time in Step 309.

Figure 4:
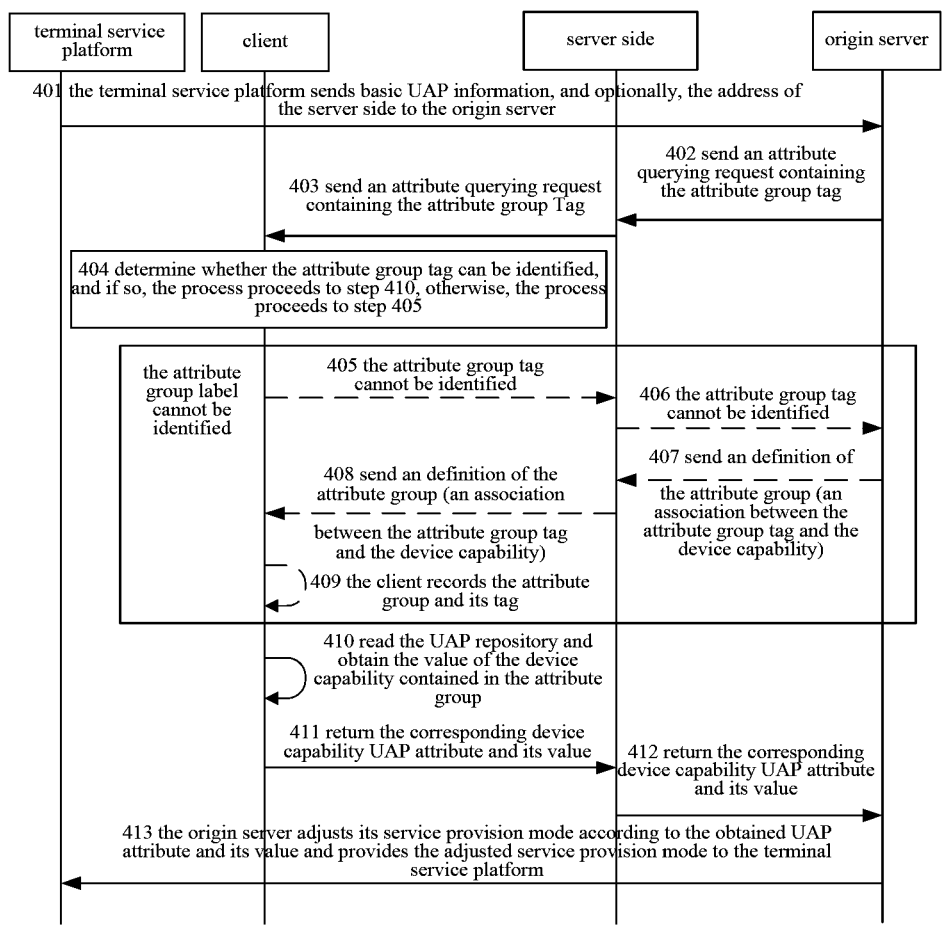
FIG. 4 is a schematic diagram showing another process for reporting UAP information during the establishment of a connection, according to an embodiment of the invention.

With reference to FIG. 4, there is shown a process for reporting UAP information according to an embodiment of the invention during the establishment of a connection in the case that a server side is independent of an origin server.

Step 401: A terminal service platform sends an application request which contains basic UAP information and may further contain the address of a server side, to an origin server.

Step 402: The origin server determines an attribute group and the address of the server side to be queried according to the received application request, and issues a UAP querying request message containing the attribute group label to the server side.

Step 403: The server side forwards the received request message to a client.

Step 404: The client queries a preset attribute group and a label of the preset attribute group, i.e. an association table, according to the received attribute group label, to determine whether the attribute group label exists in the association table, and if so, the process proceeds with Step 410; otherwise, the process proceeds with Step 405. The preset attribute group and the label of the preset attribute group may be located in the client, in a UAP repository, or in a terminal device independently of the client and the UAP repository.

Steps 405-406: The client sends error information containing an indication that the attribute group label cannot be identified to the origin server via the server side.

Steps 407-408: The origin server sends an attribute group definition indicating the association between the attribute group and the label of the attribute group, to the client via the server side; that is, the origin server notifies the client of the UAP attribute associated with the attribute group label.

Step 409: The client records the received attribute group and the label of the received attribute group; that is, the client adds the received attribute group label definition to the association table, and then the process proceeds with Step 410.

Step 410: The client obtains device capability UAP attributes contained in the attribute group and the values of the device capability UAP attributes by reading the UAP repository.

Step 411-412: The client reports the device capability UAP attributes contained in the attribute group and the values of the device capability UAP attributes, to the origin server via the server side.

Step 413: The origin server adjusts a service provision mode, according to the obtained UAP attributes and values of the obtained UAP attributes, and then provides the adjusted service provision mode to the terminal service platform.

In the above process, the server side may not process the error information indicating that the attribute group cannot be identified after receiving the error information from the client; that is, Steps 405 and 406 are optional steps and may be omitted.

Figure 5:
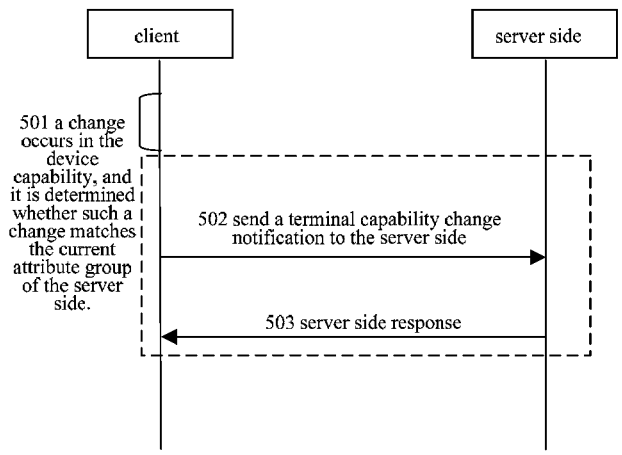
FIG. 5 is a schematic diagram showing a process for reporting UAP information in the case that a change of UAP information occurs, according to an embodiment of the invention.

With reference to FIG. 5, there is shown a process for reporting UAP information in the case that a change of UAP information occurs, according to an embodiment of the invention.

Step 501: If a client detects that a change occurs in the value of UAP attribute and determines that such a change affects an existing service, the process proceeds with Step 502. If the client detects that a change occurs in the value of UAP attribute and determines that such a change does not affect the existing service, the client does not perform subsequent steps.

Step 502-503: The client sends a notification that a change occurs in the value of the UAP attribute to the server side, the notification contains the changed UAP attribute and the value of the changed UAP attribute, and receives a response from the server side.

The dashed block in FIG. 5 indicates that such a change affects the existing service.

Figure 6:
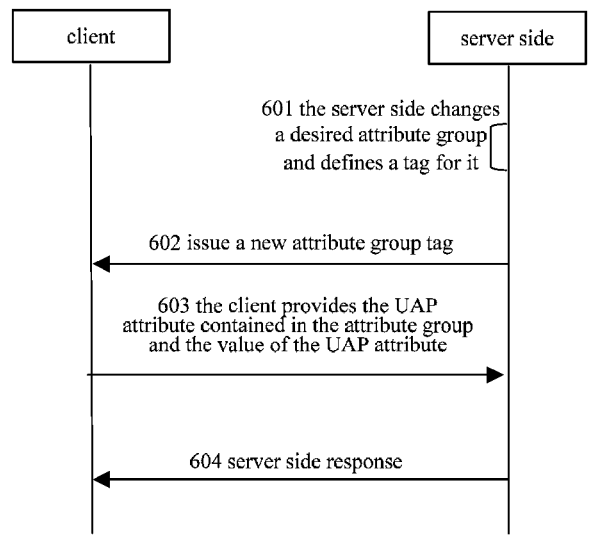
FIG. 6 is a schematic diagram showing a process for reporting UAP information in the case that a service at a server side is updated, according to an embodiment of the invention.

With reference to FIG. 6, there is shown a process for reporting UAP information in the case that a service at a server side is updated, according to an embodiment of the invention.

Step 601: A server side changes a desired attribute group and defines a new attribute group label for it.

Step 602: The server side sends the new attribute group label to a client.

Step 603-604: The client obtains the UAP attributes corresponding to the new attribute group label from the preset association table according to the received information, reports the UAP attributes in the attribute group and values of the UAP attributes, and receives a response from the server side.

The above processes will be illustrated in detail in conjunction with flow diagrams.

Figure 7:
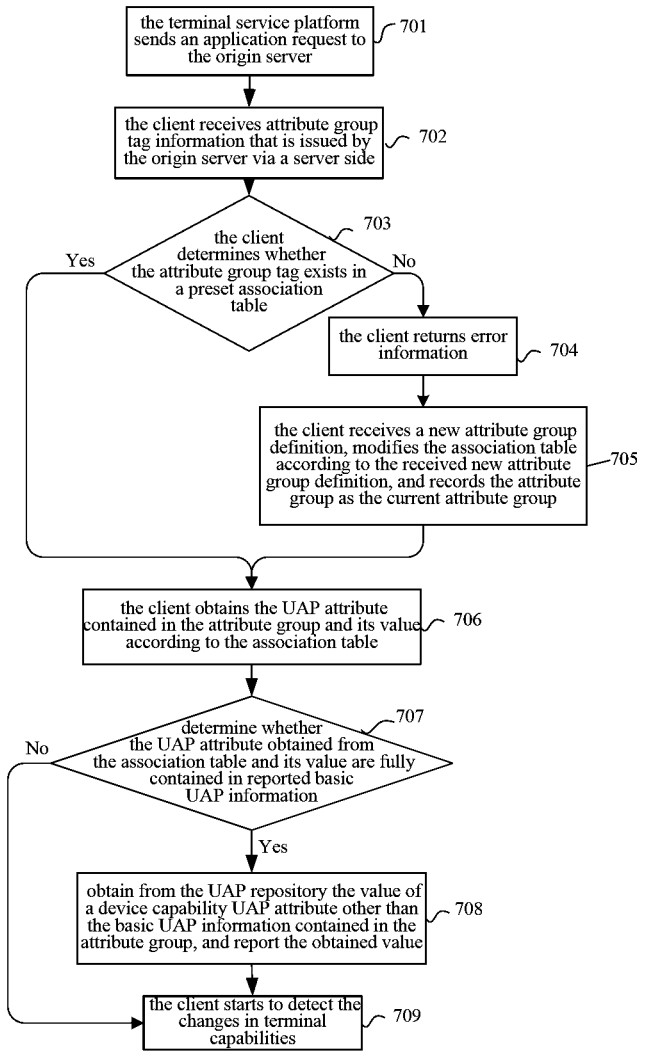
FIG. 7 is a flow diagram showing the operation of a terminal in a process for reporting UAP information during the establishment of a connection, according to an embodiment of the invention.

With reference to FIG. 7, there is shown the operation of a terminal in a process for reporting UAP information during the establishment of a connection, according to an embodiment of the invention.

Step 701: A terminal service platform sends an application request which contains basic UAP information and may optionally contain the address of a server side, to an origin server.

Step 702: The client receives attribute group label information issued by the origin server via the server side.

Step 703: The client determines whether the attribute group label exists in a preset association table, that is, the client determines whether the attribute group has been defined, and if so, the process proceeds with Step 706; otherwise, the process proceeds with Step 704.

Step 704: The client returns error information containing an indication that the attribute group cannot be identified.

Step 705: The client receives a new attribute group definition and modifies the association table according to the new attribute group definition; that is, the client adds the new attribute group definition to the association table and records the attribute group as the current attribute group, and then the process proceeds with Step 706.

Step 706: The client obtains UAP attributes contained in the attribute group and values of the UAP attributes, according to the association table.

Step 707: The client determines whether the UAP attributes and values of the UAP attributes obtained from the association table are fully contained in the reported basic UAP information, and, if so, the client will not perform reporting, and the process directly proceeds with Step 709; otherwise, the process proceeds with Step 708.

Step 708: The client obtains from the UAP repository the values of device capability UAP attributes other than the basic UAP information contained in the attribute group, and reports the obtained device capability UAP attributes and values of the obtained device capability UAP attributes to the server side.

Step 709: The client starts to detect a change of UAP information.

Figure 8:
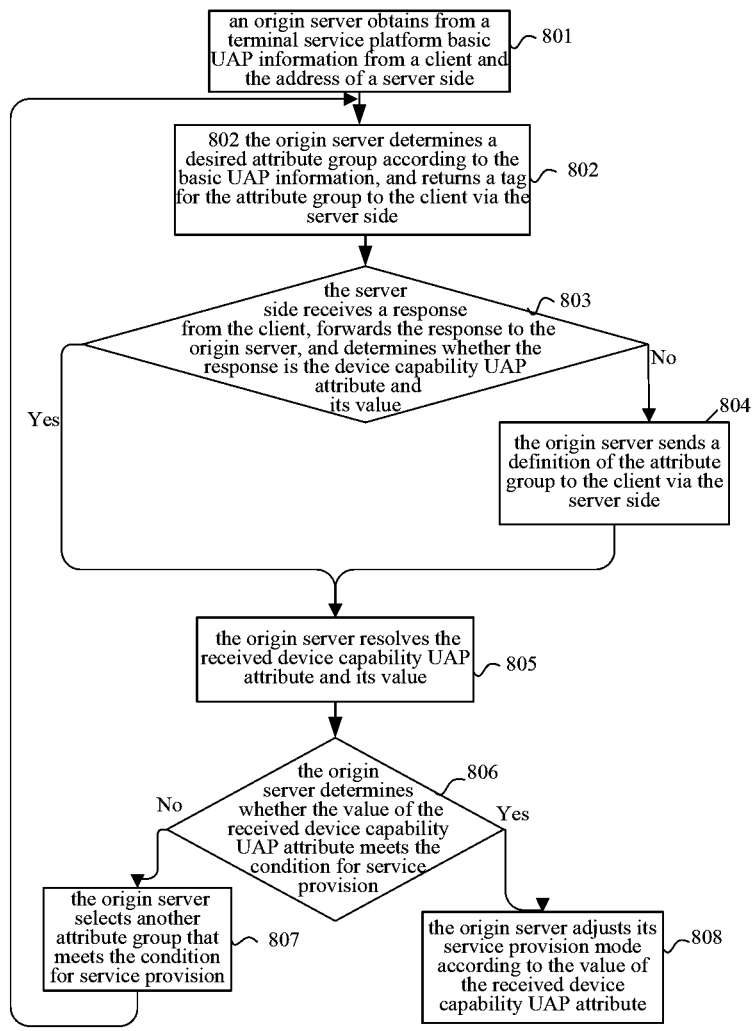
FIG. 8 is a flow diagram showing the operation of a server in a process for reporting UAP information during the establishment of a connection, according to an embodiment of the invention.

With reference to FIG. 8, there is shown the operation of a server in a process for reporting UAP information during the establishment of a connection, according to an embodiment of the invention.

Step 801: An origin server obtains basic UAP information and the address of a server side from an application request from a terminal service platform.

Step 802: The origin server determines a desired attribute group according to the basic UAP information, and then the origin server returns an attribute group label to a client via the server side.

The origin server determines the location of the server side by directly using the address of the server side if the address of the server side is contained in the application request; or by pre-configuration or other methods if the address of the server side is not contained in the application request.

Step 803: The server side receives a response from the client and forwards the response to the origin server. If the response contains device capability UAP attributes and values of the device capability UAP attributes, it is indicated that the client has identified the attribute group represented by the issued attribute group label, and the process proceeds with Step 805. If the response is error information indicating that the attribute group cannot be identified, the process proceeds with Step 804.

Step 804: The origin server sends an attribute group definition to the client via the server side; that is, the origin server notifies the client of the attribute group and the label of the attribute group, and the process proceeds with Step 805 when the origin server receives the device capability UAP attributes contained in the attribute group and values of the device capability UAP attributes.

Step 805: The origin server resolves the received device capability UAP attributes and values of the received capability UAP attributes.

Step 806: The origin server determines whether a condition for service provision, i.e. a service requirement, is met according to the values of the received device capability UAP attributes, that is, the origin server determines whether the UAP information indicates that the client supports the service, and, if so, the process proceeds with Step 808; otherwise, the process proceeds with Step 807.

Step 807: The origin server selects another attribute group that meets the application request, and then the process returns to Step 802.

Step 808: The origin server adjusts a service provision mode, for example, adapts contents to be provided according to the values of the received device capability UAP attributes.

Because the server side may not process the error information indicating that the attribute group cannot be identified after receiving the error information from the client, Step 705 in FIG. 7 and Step 804 in FIG. 8 may be omitted; that is, Step 705 and Step 804 are optional steps.

If the basic UAP information is not contained in the application request sent by the terminal service platform, Step 707 in FIG. 7 should be omitted, and in Step 708, all UAP attributes contained in the attribute group and values of the all UAP attributes will be reported. Accordingly, in Step 801 of FIG. 8, the origin server will only receive an application request that does not contain the basic UAP information, and in Step 802, the origin server selects a suitable attribute group according to the application request.

Figure 9:
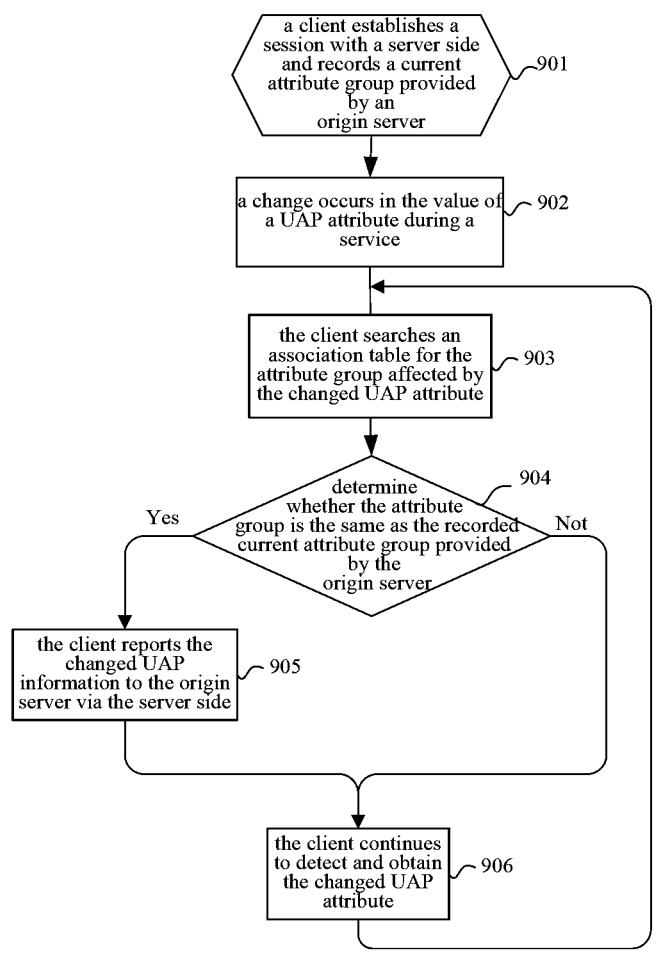
FIG. 9 is a flow diagram showing a process for reporting UAP information in the case that a change of UAP information occurs, according to an embodiment of the invention.

With reference to FIG. 9, there is shown a process for reporting UAP information in the case that a change of UAP information occurs, according to an embodiment of the invention.

Step 901: A client records a current attribute group for which the server side currently provides an application.

Step 902: The client detects UAP attributes and determines that the value of a UAP attribute has been currently changed.

Step 903: The client queries a preset association table to determine that the changed UAP attribute will affect an attribute group.

Step 904: The client determines whether the affected attribute group is consistent with the recorded current attribute group provided by the origin server; that is, the client determines whether a change of the value of the UAP attribute will affect an existing service, and, if so, the process proceeds with Step 905; otherwise, the client will not report the changed UAP attribute, and the process directly proceeds with Step 906.

Step 905: The client obtains the value of the changed UAP attribute from a UAP repository, and reports the changed UAP attribute and the value of the changed UAP attribute to the origin server via the server side, and then the process proceeds with Step 906.

Step 906: The client continues to detect and obtain a change of a UAP attribute, and then the process returns to Step 903.

After receiving the changed UAP attribute reported by the client, the origin server readjusts a service provision mode, for example, adapts contents to be provided according to the value of the changed UAP attribute. Here, the process for obtaining the changed UAP attribute by the server side is consistent with that described for the corresponding portion in FIG. 8 and will not be described herein.

Figure 10:
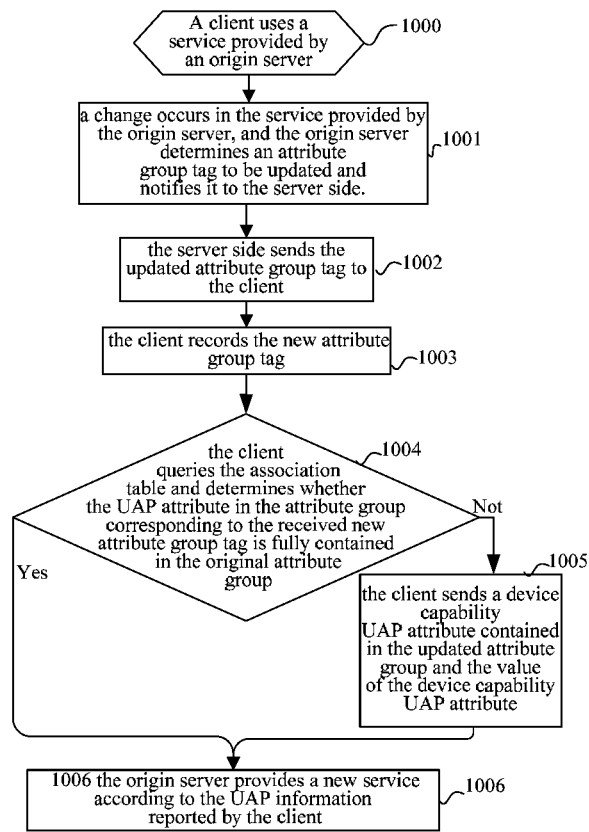
FIG. 10 is a flow diagram showing a process for reporting UAP information in the case that a service at a server side is updated, according to an embodiment of the invention.

With reference to FIG. 10, there is shown a process for reporting UAP information in the case that a service at a server side is updated, according to an embodiment of the invention.

Step 1000: A client uses a service provided by an origin server.

Step 1001: A change occurs in the service provided by the origin server. The origin server determines an updated attribute group label and notifies a server side of the updated attribute group.

Step 1002: The server side sends the updated attribute group label to the client.

Step 1003: The client saves the updated new attribute group label.

Step 1004: The client queries an association table to determine whether a UAP attribute in an attribute group corresponding to the new attribute group label is fully contained in an original attribute group, and, if so, the process proceeds with Step 1006; otherwise, the process proceeds with Step 1005.

Step 1005: The client sends a device capability UAP attribute contained in the updated attribute group and a value of the device capability UAP attribute in the same manner as that described for the corresponding portion in FIG. 7, and then the process proceeds with Step 1006.

Step 1006: The origin server provides a new service, according to the UAP information reported by the client.

For all of the above processes, the UAP attribute includes basic UAP attributes and device capability UAP attributes. The basic UAP attributes include basic characteristic information of the hardware, software, and network that may affect all services, such as screen size, color, resolution, memory size, carrier, time delay, and network bandwidth. The device capability UAP attributes include information other than the basic UAP attributes that may affect the services and may be associated with certain services. Different device capability UAP attributes may affect one or more attribute group labels. Some attribute group label may need only basic UAP attributes, while other attribute group labels may also need one or more device capability UAP attributes. For example, Digital Rights Management (DRM) service needs device capability UAP attributes, such as DrmTechnology (if a terminal supports DRM technology), DrmVersion (Version of DRM Agent), DrmPermissions (Permission Information of DRM Agent), DrmConstraint (Constraint Information of DRM Agent), and DrmMediaTypesSupported (List of Protected Multipurpose Internet Mail Extensions Protocol Types supported by a device). The ordinary skilled in the art will appreciate that some or all of the steps in the method provided by the above embodiment may be implemented by using a program to instruct related hardware to perform them. The program may be stored in a computer-readable storage medium, such as ROM/RAM, a magnetic disk, or a compact disk.

Figure 11:
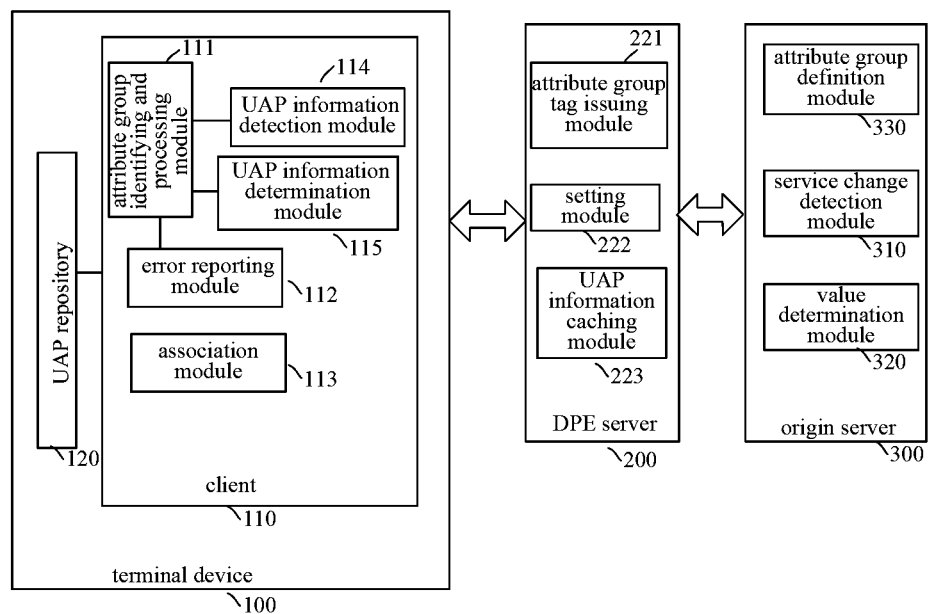
FIG. 11 is a block diagram showing a structure of a system, according to an embodiment of the invention.

With reference to FIG. 11, an embodiment of the invention further provides a system for reporting UAP attributes. The system includes a client 110 located in a terminal device 100, a DPE server 200, and an origin server 300. The client 110 includes an attribute group identifying and processing module 111, and the DPE server 200 includes an attribute group label issuing module 221.

The attribute group label issuing module 221 in the DPE server 200 is adapted to issue a querying message containing an attribute group, according to a UAP information querying request received from the origin server by the DPE server 200. The attribute group label is issued to the client 110 by means of HTTP, Simple Object Access Protocol (SOAP), or other protocols.

The attribute group identifying and processing module 111 in the client 110 is adapted to identify the attribute group, obtain and report the UAP attribute contained in the attribute group, and a value of the UAP attribute to the DPE server 200.

The terminal device 100 further includes a UAP attribute repository 120. The attribute group identifying and processing module 111 in the client is adapted to obtain the UAP attribute contained in the attribute group from the UAP repository 120, according to a preset association table that may be located in the client, in the UAP repository, or in the terminal device independently of the client and the UAP repository. The client 110 carries the reported UAP information in HTTP or in another protocol.

The UAP repository 120 is adapted to store the UAP attribute and the value of the UAP attribute.

For the system shown in FIG. 10, the client 110 may further include an error reporting module 112, which is adapted to report error information containing an indication that the attribute group cannot be identified to the DPE server 200, in the case that the attribute group identifying and processing module 111 cannot identify the attribute group.

The DPE server 200 may further include a setting module 222, which is adapted to issue to the client 110 an attribute group and a label set for the attribute group. The client 110 may further include an association module 113, which is adapted to add to the association table the attribute group and the label of the attribute group carried in a setting message received by the client 110, according to the setting message and to instruct the attribute group identifying and processing module 111 to perform reporting.

The client 110 may further include a UAP information detection module 114, and the UAP information detection module 114 is adapted to instruct the attribute group identifying and processing module 111 to perform reporting after determining that a change of UAP information will affect an existing service, and not to report the changed UAP attribute after determining that the change of UAP information will not affect the existing service.

The application request received by the origin server 300 may further include basic UAP information, in which case, the application request received by the origin server 300 may further include basic UAP information, in which case, the client 110 may further include a UAP information determination module 115 which is adapted to determine whether UAP attributes obtained from the association table is fully contained in the reported basic UAP attributes after determining that the attribute group exists in the association table. If the UAP information determination module 115 determines that the UAP attributes contained in the attribute group is fully contained in the basic UAP attributes in the UAP repository 120, the UAP information determination module 115 instructs the attribute group label identifying and processing module 111 not to report the UAP attribute; otherwise, the UAP information determination module 115 instructs the attribute group identifying and processing module 111 to report device capability UAP attributes other than the basic UAP attributes and values of the basic UAP attributes.

The origin server 300 may include an attribute group definition module 330 which is adapted to define an attribute group and to issue the attribute group to the client 110 via the setting module 222 in the DPE server 200.

The origin server 300 may further include a service change detection module 310 which is adapted to instruct the attribute group label issuing module 221 in the DPE server 200 to issue an updated attribute group label to the client 110, after detecting a change of an attribute group label of the service change detection module 310.

The origin server 300 may further include a value determination module 320 which is adapted to determine whether the received device capability UAP value indicates that the client supports the attribute group, and, if so, to instruct an existing content adjusting module to adjust a service provision mode; otherwise, to instruct the attribute group label issuing module 221 to issue another attribute group label that meets the application request to the client 110.

An embodiment of the invention further provides a terminal device for reporting UAP information. With reference to FIG. 10, the terminal device includes a client. The client includes an attribute group identifying and processing module. The terminal device further includes a UAP repository. The terminal device may further include an error reporting module adapted to report the fact that an attribute group cannot be identified, an association module adapted to record an attribute group label and UAP information contained in the attribute group, a UAP information determination module or UAP information detection module adapted to detect a change of UAP information, or any combination thereof.

An embodiment of the invention further provides a DPE server for issuing attribute group label information. With reference to FIG. 10, the DPE server includes an attribute group label issuing module 221, a setting module 222, and a UAP information caching module 223. The setting module 222 is adapted to set an attribute group by issuing an attribute group setting message to the client 110, according to a request from an origin server, the attribute group label issuing module 221 is adapted to issue a querying message containing an attribute group, according to a UAP information querying request received from the origin server, and the UAP information caching module 223 is adapted to cache UAP information reported by the attribute group label identifying and processing module 111.

The client is a DPE client. The DPE server may also be integrated in the origin server 300, in which case, the messages used in the interaction between the DPE server 200 and the origin server 300 are present in the origin server.

Figure 12:
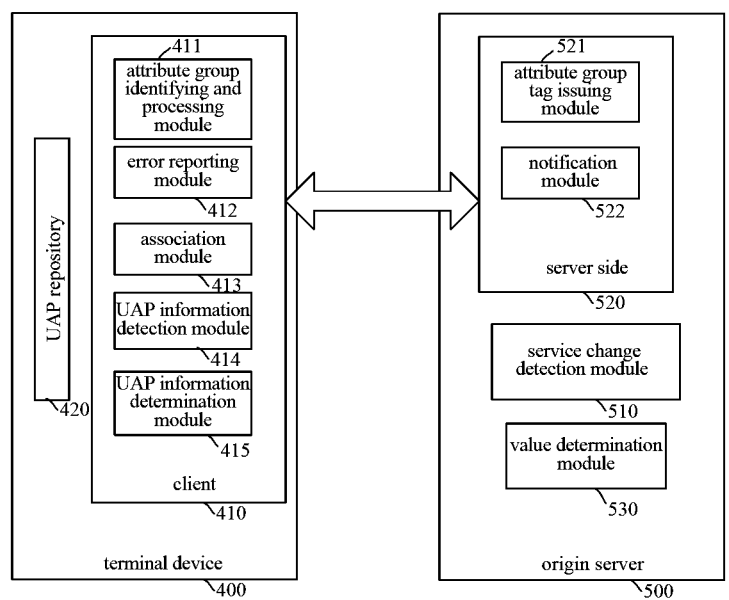
FIG. 12 is a block diagram showing a structure of a system, according to another embodiment of the invention.

With reference to FIG. 12, there is shown a system for reporting UAP information in the case that the DPE server is integrated in the origin server. The system includes a client 410 located in a terminal device 400 and a server side 520 located in an origin server 500. The client 410 further includes an attribute group identifying module 411, and the server side 520 includes an attribute group label issuing module 521.

The attribute group label issuing module 521 in the server side 520 is adapted to issue a response message containing an attribute group label according to a received service request. The attribute group label may be carried in an extended HTTP message header "x-wap-profile-warning" and be issued to the client, or be issued to the client via SOAP or other protocols.

The attribute group identifying and processing module 411 in the client 410 is adapted to identify an attribute group and to obtain and report UAP attributes contained in the attribute group and values of the UAP attributes.

The terminal device 400 further includes a UAP attribute repository 420. The attribute group identifying and processing module 411 in the client is adapted to obtain UAP attributes contained in an attribute group, according to a preset association table representative of the association between an attribute group label and a capability attribute, and to obtain a value of the UAP attribute from the UAP repository 420. The preset association table may be located in the client, in the UAP repository, or in the terminal device independently of the client and the UAP repository. The client carries the reported UAP information in an extended HTTP message header "x-wap-profile-diff" or in other protocols.

The UAP repository 420 is adapted to store UAP attributes and values of the UAP attributes.

For the system shown in FIG. 12, the client 410 may further include an error reporting module 412, which is adapted to report error information containing an indication that an attribute group cannot be identified to the server side 520 in the case that the attribute group cannot be identified.

The server side 220 may further include a notification module 522, which is adapted to notify the client 410 of an attribute group definition. The client 410 may further include an association module 413, which is adapted to add the attribute group definition to the association table representative of the association between the attribute group label and the capability attribute, according to a received notification, and then to instruct the attribute group identifying and processing module 411 to perform reporting.

The client 410 may further include a UAP information detection module 414, which is adapted to instruct the attribute group identifying and processing module 411 to perform reporting after determining that a change of UAP information of the UAP information detection module 414 will affect an existing service, and not to report the changed UAP information after determining that the change of the UAP information of the UAP information detection module 414 will not affect the existing service.

An application request received by the server side may further include basic UAP information, in which case, the client 410 may further include a UAP information determination module 415 which is adapted to determine whether the UAP information obtained from a preset association table is fully contained in the reported basic UAP information, after determining that the attribute group exists in the association table, and, if so, not to report the UAP information; otherwise, to instruct the attribute group identifying and processing module 411 to report device capability UAP attributes other than the basic UAP information and values of the device capability UAP attributes.

The server 500 may further include a service change detection module 510 which is adapted to instruct the attribute group label issuing module 521 to issue an updated attribute group label to the client after detecting that a change occurs in a service of the service change detection module 510.

The server 500 may further include a value determination module 530, which is adapted to determine whether the received device capability UAP value indicates that the client supports the attribute group, and, if so, to instruct an existing content adjusting module to adjust a service provision mode; otherwise, to instruct the attribute group label issuing module 521 to issue another attribute group label that meets the application request to the client.

The client is a DPE client, and the server side is a DPE server.

The invention will now be further illustrated in conjunction with a specific embodiment.

Considering the case that a user is involved in an application that is a location-based multiplayer game, basic UAP attributes of the application are shown in Table 1:

TABLE 1

| Basic Device Information | WAP Service | DRM Service | MMS Service | LCS Service |
|---|---|---|---|---|
| Screen Size | WML Version | DrmTechnology | MmsVersion | . . . |
| Color Support | WML Script Library | DrmVersion | MmsMaxMessageSize | |

TABLE 1-continued

| Resolution | Card Size | DrmPermissions | MmsMaxImageResolution |
|---|---|---|---|
| Memory Size | WTAI Library | DrmConstraint | MmsCcppAccept |
|  | ... | DrmMediaTypesSupported | MmsCcppAcdeptCharSet |
| Operation System | PUSH Service | DM Service | VIDEO Service ... |
| Manufacturer & Version |  |  |  |
| Content Type | Push Content Type | DMEnabled | VideoPlayerSupported |
| Character Set | Push Application Type | DMVersion | VideoCallSupported |
|  | Push Character Set | CPEnabled | VideoFormat |
| Carrier | Push Message Size | CPVersion | VideoMaxDownloadSize |
| Time Delay | ... | FUMOEnabled | AudioCodecs |
| Reliability |  | FUMOVersion |  |

An attribute group association table maintained by the client for a service is as shown in Table 2.

TABLE 2

| Attribute Group label required by a Service | Screen Size | Color Support | WAP Version | Card Size | WML Script Library | DM Enabled | MMS Version | MMSCcpp | ... |
|---|---|---|---|---|---|---|---|---|---|
| WAP | ✓ | ✓ | ✓ | ✓ | ✓ |  |  |  |  |
| PUSH | ✓ | ✓ |  |  |  |  |  |  |  |
| DRM | ✓ | ✓ |  |  |  |  |  | ✓ |  |
| DM | ✓ | ✓ |  |  |  | ✓ |  |  |  |
| MMS | ✓ | ✓ |  |  |  |  | ✓ | ✓ |  |
| LCS | ✓ | ✓ |  |  |  |  |  |  |  |
| BCAST | ✓ | ✓ |  |  |  |  |  |  |  |
| Video | ✓ | ✓ |  |  |  |  |  | ✓ |  |
| ... | ✓ | ✓ |  | ✓ |  |  |  | ✓ |  |

A process for interaction is as follows:

1) The user uses a terminal device to initiate a location-based multiplayer shooting game, and a game client (i.e. the terminal service platform in the above embodiments) sends basic UAP information to an application server (i.e. the origin server in the above embodiments). The basic UAP attributes include basic hardware information, basic software information and basic network information, such as screen size, color support, resolution, memory size, carrier, time delay, and network bandwidth.

2) The application server decides to deliver contents in Multimedia Message Service (MMS) mode, according to the reported information after receiving information reported by the terminal service platform, and notifies a DPE client (i.e. the client in the above embodiments) via a DPE server side (i.e. the server side in the above embodiments), that a currently required attribute group label is MMS+LCS.

3) The DPE client records a current attribute group, queries UAP attributes contained in MMS+LCS, queries the values of the UAP attributes from a UAP repository, and notifies the DPE server side of such information. The DPE server side sends such information to the application server.

4) CELL-ID based locating is used in the current application. The user runs the application, and the DPE client starts to detect a change of a terminal capability attribute.

5) The DPE client enables Assisted Global Positioning System (A-GPS) function. If the DPE client detects that a change occurs in a value of a device capability UAP and determines that such a capability change will affect the game (based on the fact that this attribute is contained in the current attribute group), the DPE client notifies the DPE server side of the changed device capability UAP attribute and a value of the changed device capability UAP attribute.

6) After obtaining the changed device capability UAP attribute, the DPE server side reports the changed device capability UAP attribute to the application server. The application server determines that a more precise locating may be currently employed according to the changed device capability UAP attribute, and adapts contents to be provided.

7) During the service, the user activates a camera, if the DPE client detects that a change occurs in the device capability UAP attribute and determines that such a capability change will not affect the game, the DPE client decides not to report information indicating such a capability change to the DPE server side.

8) During the service, if an abnormality occurs in the GPRS function of the network, the DPE client notifies the server of this abnormality.

9) The server side terminates the service, decides to transmit data in SMS mode, and queries the DPE client about SMS's capability.

It can be seen that, according to the embodiments of the invention, an association is established between a UAP attribute and an attribute group label, and that a client identifies an attribute group and reports a UAP attribute related to the identified attribute group to a server side, thereby avoiding reporting all UAP attributes and further saving network resources. Moreover, in the case that a change occurs in a device capability UAP attribute of a terminal or in a service at a server side, if such a change affects an existing service, the client only needs to send the changed device capability UAP attribute to the server side, thereby further avoiding transmitting a large number of UAP attributes and further saving the network resources.

Additional advantages and modifications will readily occur to those skilled in the art. Therefore, the invention in its broader aspects is not limited to the specific details and representative embodiments shown and described herein. Accordingly, various modifications and variations may be made without departing from the spirit or scope of the invention as defined by the appended claims and their equivalents.

What is claimed is:

1. In a client located in a terminal device, a method for reporting User Agent Profile (UAP) information to a server side, comprising:
   receiving an attribute group label issued by the server side;
   identifying an attribute group according to an association between the attribute group label and the attribute group, wherein the attribute group comprises a preset group of UAP attributes, and at least one UAP attribute from the preset group of the UAP attributes represents a device capability of the terminal device;
   obtaining and reporting the at least one UAP attribute and a value of the UAP attribute to the server side to allow the server side to adjust a service provision mode according to the obtained UAP attribute and the value of the UAP attribute.

2. The method according to claim 1, further comprising detecting a change of the value of the UAP attribute, determining that the change of the value of the UAP attribute affects an existing service, and obtaining the value of the changed UAP attribute and reports the changed UAP attribute and the value of the changed UAP attribute to the server side.

3. The method according to claim 2, wherein the determining the change of the UAP attribute affects the existing service comprises:
   recording the attribute group currently provided by the server side, and determining the attribute group label affected by the change of the UAP attribute is consistent with the recorded attribute group currently provided by the server side, determining that the change in the UAP attribute affects the existing service.

4. The method according to claim 2, further comprising determining the attribute group label affected by the change of the UAP attribute is not consistent with the recorded attribute group currently provided by the server side, determining that the change in the UAP attribute does not affect the existing service, deciding not to report the change of the UAP attribute to the server side.

5. The method according to claim 1, wherein the method further comprises:
   receiving an attribute group setting message carrying an attribute group definition issued by the server side, wherein the attribute group definition containing an attribute group and the attribute group label associated with the attribute group;
   storing the association between the attribute group and the attribute group label according to the received setting message in an association table.

6. The method according to claim 5, further comprising: receiving a new attribute group definition and modifies the association table according to the new attribute group definition.

7. The method according to claim 1, wherein the UAP attribute includes basic UAP attributes and device capability UAP attributes, the basic UAP attributes including basic characteristic information of hardware, software, and a network of the terminal device that affects all services, the device capability UAP attributes including rest of information in the UAP attributes other than the basic UAP attributes that affects the services and may be associated with certain services.

8. The method according to claim 7, further comprising:
   before the client identifies the attribute group, reporting, by a terminal service platform, a basic UAP attribute to the server side; and
   after identifying the attribute group, determining, by the client, whether the obtained UAP attribute is fully contained in the reported basic UAP attribute, and
   if the obtained UAP attribute is fully contained in the reported basic UAP attribute, not performing reporting;
   if the obtained UAP attribute is not fully contained in the reported basic UAP attribute, obtaining a value of a device capability UAP attribute other than the basic UAP attribute from a UAP repository and reporting the device capability UAP attribute and the value of the device capability UAP attribute.

9. The method according to claim 1, further comprising:
   receiving an updated attribute group label issued by the server side, wherein the updated attribute group label is caused by a change of the service;
   obtaining a UAP attribute and its value contained in the updated attribute group if the UAP attributes contained in the updated attribute group are not fully contained in an original attribute group of the service; and
   reporting the UAP attribute and the value of the UAP attribute to the server side.

10. An application server for providing a service according to User Agent Profile (UAP) information received from a terminal device, comprising: a memory and at least one processor coupled to the memory, wherein the at least one processor is configured to:
    issue a message containing an attribute group label according to a service request sent from a terminal service platform;
    receive a UAP attribute contained in the attribute group associated with the attribute group label and a value of the UAP attribute;
    adjust a service provision mode according to the obtained UAP attribute and the value of the UAP attribute, and provide a service to the terminal service platform according to the adjusted service provision mode.

11. The application server according to claim 10, wherein the at least one processor is further configured to: detect that a change of the service occurs which causes a corresponding attribute group label to be updated;
    issue an updated attribute group label to the client located in the terminal device.

12. The application server according to claim 10, wherein the at least one processor is further configured to:
    issue another attribute group label that meets the condition for service provision to the client, after determining that the received value of the UAP attribute does not meet the condition.

13. A method for using User Agent Profile (UAP) information to provide a service, comprising:
    issuing, by a server side, an attribute group label to a client located in a terminal device;
    receiving, by a server side, at least one UAP attribute and a value of the UAP attribute from the client, wherein the at least one UAP attribute representing a device capability of the terminal device is contained in an attribute group associated with the attribute group label, and the attribute group comprises a preset group of the UAP attributes;
    adjusting, by the server side, a service provision mode according to the received UAP attribute and the value of the UAP attribute, and providing a service to the terminal device according to the adjusted service provision mode.

14. The method according to claim 13, further comprising:
    detecting that a change of the service occurs which causes a corresponding attribute group label to be updated;
    issuing an updated attribute group label to the client located in the terminal device.

15. The method according to claim 13, further comprising:
determining, by the server side, whether a condition for service provision is met according to the received value of the UAP attribute, and if the condition for the service provision is met according to the received value of the UAP attribute, adjusting a service provision mode according to the received UAP attribute, if the condition for the service provision is not met according to the received value of the UAP attribute, selecting another attribute group label that meets the condition and issuing the attribute group label to the client.

16. A computer-readable non-transitory storage device storing instructions that when executed by a terminal device comprising a processor causes the processor to perform a method, the method comprising:
receiving an attribute group label issued by the server side;
identifying an attribute group according to an association between the attribute group label and the attribute group, wherein the attribute group comprises a preset group of User Agent Profile (UAP) attributes, and at least one UAP attribute from the preset group of the UAP attributes represents a device capability of the terminal device;
obtaining and reporting the at least one UAP attribute and a value of the UAP attribute to the server side to allow the server side to adjust a service provision mode according to the obtained UAP attribute and the value of the UAP attribute.

17. The storage device according to claim 16, wherein the method further comprises detecting a change of the value of the UAP attribute, determining that the change of the value of the UAP attribute affects an existing service, and obtaining the value of the changed UAP attribute and reports the changed UAP attribute and the value of the changed UAP attribute to the server side.

18. The storage device according to claim 17, wherein the determining the change of the UAP attribute affects the existing service comprises:
recording the attribute group currently provided by the server side, and determining the attribute group label affected by the change of the UAP attribute is consistent with the recorded attribute group currently provided by the server side, determining that the change in the UAP attribute affects the existing service.

19. The storage device according to claim 16, wherein the method further comprises determining the attribute group label affected by the change of the UAP attribute is not consistent with the recorded attribute group currently provided by the server side, determining that the change in the UAP attribute does not affect the existing service, deciding not to report the change of the UAP attribute to the server side.

* * * * *